United States Patent [19]
Walker et al.

[11] Patent Number: 6,061,723
[45] Date of Patent: May 9, 2000

[54] NETWORK MANAGEMENT EVENT CORRELATION IN ENVIRONMENTS CONTAINING INOPERATIVE NETWORK ELEMENTS

[75] Inventors: Anthony Walker; Eric A. Pulsipher; Darren D. Smith, all of Fort Collins, Colo.

[73] Assignee: Hewlett-Packard Company, Palo Alto, Calif.

[21] Appl. No.: 08/947,219

[22] Filed: Oct. 8, 1997

[51] Int. Cl.[7] .............................. G06F 3/00; G06F 11/20
[52] U.S. Cl. ......................... 709/224; 709/225; 709/229
[58] Field of Search ................................... 709/224, 225, 709/300, 229; 379/21, 111; 370/255

[56] References Cited

U.S. PATENT DOCUMENTS

| | | | |
|---|---|---|---|
| 5,027,269 | 6/1991 | Grant et al. | 709/300 |
| 5,027,342 | 6/1991 | Boulton et al. | 370/225 |
| 5,185,860 | 2/1993 | Wu | 709/224 |
| 5,276,789 | 1/1994 | Besaw et al. | 345/440 |
| 5,511,108 | 4/1996 | Severt | 379/21 |
| 5,533,093 | 7/1996 | Horton | 379/21 |
| 5,751,965 | 5/1998 | Mayo et al. | 709/224 |
| 5,805,578 | 9/1998 | Stirpe | 370/255 |
| 5,848,243 | 12/1998 | Kulkarni | 709/224 |
| 5,872,911 | 2/1999 | Berg | 379/111 |

OTHER PUBLICATIONS

"Integration Concepts" HP Open View Integration Series, Edition 1, Chapter 2, Author Hewlett Packard, Apr. 1997, Part No. J1150–90001.

"Using Network Node Manager" HP Open View, Edition 1, Chapters 1 & 6, Author Hewlett Packard, Apr. 1997, Part No. J1136–90002.

"Event Correlation Services Designer's Guide", HP Open View, Chapter 1, Auther Hewlett Packard, Jun. 1996, Part No. J1095–90002.

Seagate NerveCenter Pro: Product Information, 2 pages, 1996.

"Event Correlation Services Designer's Reference" HP Open View, Chapter 11, Author Hewlett Packard, Jun. 1996, Part No. J1095–90003.

"Event Correlation Services Administrator's Guide" HP Open View, Chapters 1 & 3, Author Hewlett Packard, Jun. 1996, Part No. J1095–90004.

Seagate NerveCenter Pro: In Depth Analysis, 4 pages, 1996.

*Primary Examiner*—Zarni Maung
*Assistant Examiner*—Khanh Quang Dinh

[57] ABSTRACT

A network monitor for distinguishing between broken and inaccessible network elements. The network monitor includes one or more computer readable storage mediums, and computer readable program code stored in the one or more computer readable storage mediums. The computer readable program code includes code for discovering the topology of a plurality of network elements, code for periodically polling a plurality of network interfaces associated with the plurality of network elements, code for computing or validating a criticalRoute attribute for each of the plurality of network interfaces, and code for analyzing a status of network interfaces identified by the criticalRoute attribute of an interface in question (IIQ) which is not responding to a poll or ping. The computer readable program code may also include code for establishing a slowPingList and placing in-memory representations of broken or failed network interfaces thereon, thereby reducing the amount of information which is presented to a network administrator from inaccessible elements not responding to a network interface poll. A means for correlating and/or suppressing events in response to the determination of whether a network interface is failed or broken is also provided. Information which is not critical to a network administrator may be suppressed, and then viewed in a "drill down" of a particular network interface.

21 Claims, 7 Drawing Sheets

NETWORK MANAGEMENT EVENT CORRELATION IN ENVIRONMENTS CONTAINING INOPERATIVE NETWORK ELEMENTS

FIELD OF THE INVENTION

The invention pertains to network management systems, and more particularly, to a technique for distinguishing between broken network elements, and network elements that are inaccessible due to the broken elements. Gathered event data is then presented to a network administrator in a simple, clear and manageable way.

BACKGROUND OF THE INVENTION

Network Management Systems like the OpenView Network Node Manager product are designed to discover network topology (i.e., a list of all network elements in a domain, their type, and their connections), monitor the health of each network element, and report problems to the network administrator. OpenView Network Node Manager (NNM) is a product distributed by Hewlett-Packard Company of Palo Alto, Calif.

The monitoring function of such a system is usually performed by a specialized computer program which periodically polls each network element and gathers data which is indicative of the network element's health. A monitor program typically runs on a single host. However, in distributed networks, monitors may run on various nodes in the network, with each monitor reporting its results to a centralized display.

A network administrator observes a presentation of network health on the display. Ideally, if a network element fails, the information presented to the network administrator identifies the following: 1) Which element is malfunctioning; 2) Which other network elements are impacted by a malfunctioning—that is, which functional network elements are inaccessible over the network because of a failing device; and 3) which inaccessible network elements are critical to the productivity of an organization relying on the network (thus, reestablishing their availability is a high priority for the network administrator).

On many commercial network management products, these three distinct classes of information are consolidated into one class. Because the failure of a single network element can result in thousands of elements (nodes and interfaces) suddenly becoming inaccessible, the network administrator (NA) is overwhelmed with information. As a result, it might take the NA considerable time to analyze the plethora of information received, and determine the root cause of the failure and its impact on the organization.

When a network element fails and many additional nodes become inaccessible, a monitor will typically continue to poll both the functioning nodes and the inaccessible nodes. Monitoring is typically done using ICMP pings (Internet Control Message Protocol Echo_Request), SNMP (Simple Network Management Protocol) messages, or IPX diagnostic requests. These activities will subsequently be referred to as "queries" or "pings". When a network element is accessible, these queries take on the order of milliseconds to process. However, when a network element is inaccessible, a query can take seconds to timeout.

This results in a flood of extraneous network traffic, and consequently, a network's performance degrades (e.g., The monitor program may run more slowly—to the point that it actually falls behind in its scheduled polls of "functioning" nodes. This can lead to even further network degradation.).

One product which attempts to solve the above problems is the NerveCenter product distributed by Seagate Software of Scotts Valley, Calif. However, the NerveCenter product does not contain a monitor program. Results are therefore achieved by forcing the NA to manually describe the network using a proprietary topology description language. This task is impractical for networks of any practical size. Further, changes to the network mandate that a NA make equivalent changes (manually) to the topology description.

Another product which attempts to solve the above problems is OpenView Network Node Manager$_{5.01}$ distributed by Hewlett-Packard Company of Palo Alto, Calif. Releases of OpenView Network Node Manager prior to and including version 5.01 (NNM$_{5.01}$) contain a monitor program called netmon, which monitors a network as described supra. NNM$_{501}$ supports environments containing a single netmon, and also supports distributed environments containing several netmon processes. In a distributed environment, a plurality of netmon processes run on various Collection Station hosts, each of which communicates topology and status information to a centralized Management Station (which runs on a different host in the network) where information is presented to the NA.

For ease of description, most of the following description is provided in the context of non-distributed environments. FIG. 1 illustrates a small network 100 with netmon running on MGR HOST N 110 and accessing the network 100 using network interface N.1 of MGR HOST N. Netmon discovers the network 100 using ICMP and SNMP and stores the topology into the topology database 118 (topo DB) through services provided by the ovtopmd database server 116. The ipmap/ovw processes 104 are interconnected 106 with ovtopmd 116, and convert topology information into a graphical display 108 which shows all discovered network elements, their connections and their status.

Netmon determines the status of each network element 124, 128–136 by ping'ing them (e.g., using ICMP). If a ping reply is returned by a particular network element 124, then the element is Up. Otherwise, the element 128 is Down. If the element 124 is Up, then ipmap/ovw 104 will display the element as green (conveyed by an empty circle in FIG. 1, 108, and in FIG. 3, 302). If the element 128 is Down it is displayed as red (conveyed by a filled circle in FIG. 1, 108, and in FIG. 3, 304). It is also possible for a node or interface to have a status of Unknown and displayed as blue (conveyed by a split circle in FIG. 3, 306–312). The cases where Unknown is used by a conventional network monitor are rare.

In addition to the topology display, NNM contains an Event System 114 for communication of node status, interface status and other information among NNM processes 120, 204 and 3rd party tools 206 (FIG. 2). These events are displayed to the NA using the xnmevents.web Event Browser 120 tool (as a list of events 122 in chronological order).

In FIG. 1, interface B.1 of node Router_B 128 has gone down, and has caused the nodes Router_B 128, Bridge C130, X132, Y134 and Z136 to suddenly become inaccessible. This causes the following events to be emitted by netmon as it discovers that these nodes 128–136 and their interfaces are down.

Interface C.2 Down
Interface C.1 Down
Interface B.1 Down
Interface B.2 Down
Interface Z.1 Down Interface Y.1 Down Interface X.1 Down Notice that the interface Down events are emitted in the random order that netmon polls the interfaces. This adds to the NA's difficulty in determining the cause of a failure using the Events Browser. The status of each node 124, 128–136 and interface is also displayed on the ovw screen 108. As previously stated, all inaccessible nodes and interfaces are displayed in the color red (i.e., a filled circle).

In a real network, with thousands of nodes on the other side of Router_B 128, neither display (ovw 108 or xnmevents.web 120) allows the NA to determine the cause of a failure and the urgency of reviving critical nodes in a short amount of time. In addition, this system 100 suffers from the network performance degradations described previously because netmon continues to poll inaccessible nodes 130–136.

It is therefore a primary object of this invention to present problems with network elements in a way that clearly indicates the root cause of a problem, allowing a NA to quickly begin working on a solution to the problem.

Another object of this invention is to provide a system and method for distinguishing between broken and inaccessible network elements.

An additional object of this invention is to provide a means of suppressing and/or correlating network events so as to 1) reduce the glut of information received by a NA upon failure of a network element, and 2) provide a means for the NA to view suppressed information in an orderly way.

It is a further object of this invention to provide a NA with a network monitor which is highly costumizable, thereby providing a number of formats for viewing information.

SUMMARY OF THE INVENTION

In the achievement of the foregoing objects, the inventors have devised a network monitor for distinguishing between broken and inaccessible network elements. The network monitor comprises one or more computer readable storage mediums (e.g., CD-ROM, floppy disk, magnetic tape, hard drive, etc.), and computer readable program code stored in the one or more computer readable storage mediums. The computer readable program code comprises 1) code for discovering the topology of a plurality of network elements, 2) code for periodically polling a plurality of network interfaces associated with the plurality of network elements, 3) code for computing or validating a critical Route attribute for each of the plurality of network interfaces, and 4) code for analyzing a status of network interfaces identified by the criticalRoute attribute of an interface in question (IIQ) which is not responding to a poll. Elements of the code for discovering the topology of a plurality of network elements and the code for periodically polling a plurality of network interfaces associated with the plurality of network elements are disclosed in U.S. Pat. No. 5,185,860 of Wu entitled "Automatic Discovery of Network Elements, and in U.S. Pat. No. 5,276,789 of Besaw et al. entitled "Graphic Display of Network Topology". Both of these patents are hereby incorporated by reference for all that they disclose.

The above described network monitor (and systems and methods for using same) provide many advantages over previous network monitor implementations.

A first advantage is automatic topology. To properly identify the root cause of a network failure requires 1) input from a topological model of the network, and 2) the current status of each element on the network. Previously, the NA was required to describe this topology manually. The design disclosed herein uses topology and status information that has already been created.

A second advantage is topological display. Topological graphical display of information is much more useful in aiding a network administrator in his or her effort to identify the root cause of a network failure and to set his or her priorities. The graphical display (ovw) used in the preferred embodiment of the invention clearly presents network element status in 3 categories:

Functioning nodes and interfaces are displayed in green to indicate Up status.

Root cause failures and inaccessible interfaces on critical server nodes are displayed in red to indicate Down status.

Non-critical, inaccessible interfaces are displayed in blue to indicate Unknown status.

A third advantage is a new manner of displaying events. The Event Browser's 120 (FIG. 1) display of node and interface status information 122 is much more useful in aiding the network administrator in his effort to identify the root cause of a network failure and to set priorities. Secondary failure events (i.e., events indicating inaccessible interfaces) are not displayed with primary failures (i.e., events indicating truly failed interfaces) and inaccessible critical nodes. Secondary failures are viewable via a "drill down" process.

A fourth advantage is network performance. With past designs, network performance degrades when a failure occurs because many more network management messages are emitted due to failed queries for inaccessible network elements. In addition, the network monitoring processes get behind schedule because failures result in time-outs which are much slower than successful queries. This design includes backoff polling algorithms for network monitoring service so as to avoid these situations whenever possible.

A fifth advantage is an ability to classify network elements. Network elements are broken into two classes, regular and critical, to help the system display information to the NA in a way that reflects his or her priorities. This is accomplished by providing a mechanism for the network administrator to define a "filter" which describes router, important servers and other network elements that the NA considers important.

A sixth advantage is scalability. Other systems are centralized in architecture, and not scalable to large enterprise networks. This implementation builds on the OpenView distributed architecture and delivers new functionality for "large" networks.

A seventh advantage is an ability to handle arbitrary topologies. Algorithms that attempt to find a root cause of a network element are easily fooled because of the complexity in customer network configurations (e.g., they may contain loops and dynamic routing). Algorithms in this implementation are "Bottoms up" and will not be fooled into thinking a network element is down when a redundant router fails.

An eighth advantage is that the system is extremely configurable. A network administrator is therefore allowed to make trade-offs that optimize his or her network, working style, and performance. Other systems tend to be manually configurable and/or rigid.

A last advantage is "event ordering." During network failure situations, confusion is compounded by implementations that discover inaccessible network elements in random order. This implementation contains new queuing algorithms to discover failures in a predictable order. This predictability is helpful to both the network administrator, and other event correlation processes that a user or third parties might construct.

These and other important advantages and objectives of the present invention will be further explained in, or will become apparent from, the accompanying description, drawings and claims.

BRIEF DESCRIPTION OF THE DRAWINGS

An illustrative and presently preferred embodiment of the invention is illustrated in the drawings in which.

DESCRIPTION OF THE PREFERRED EMBODIMENT

Figure 5:
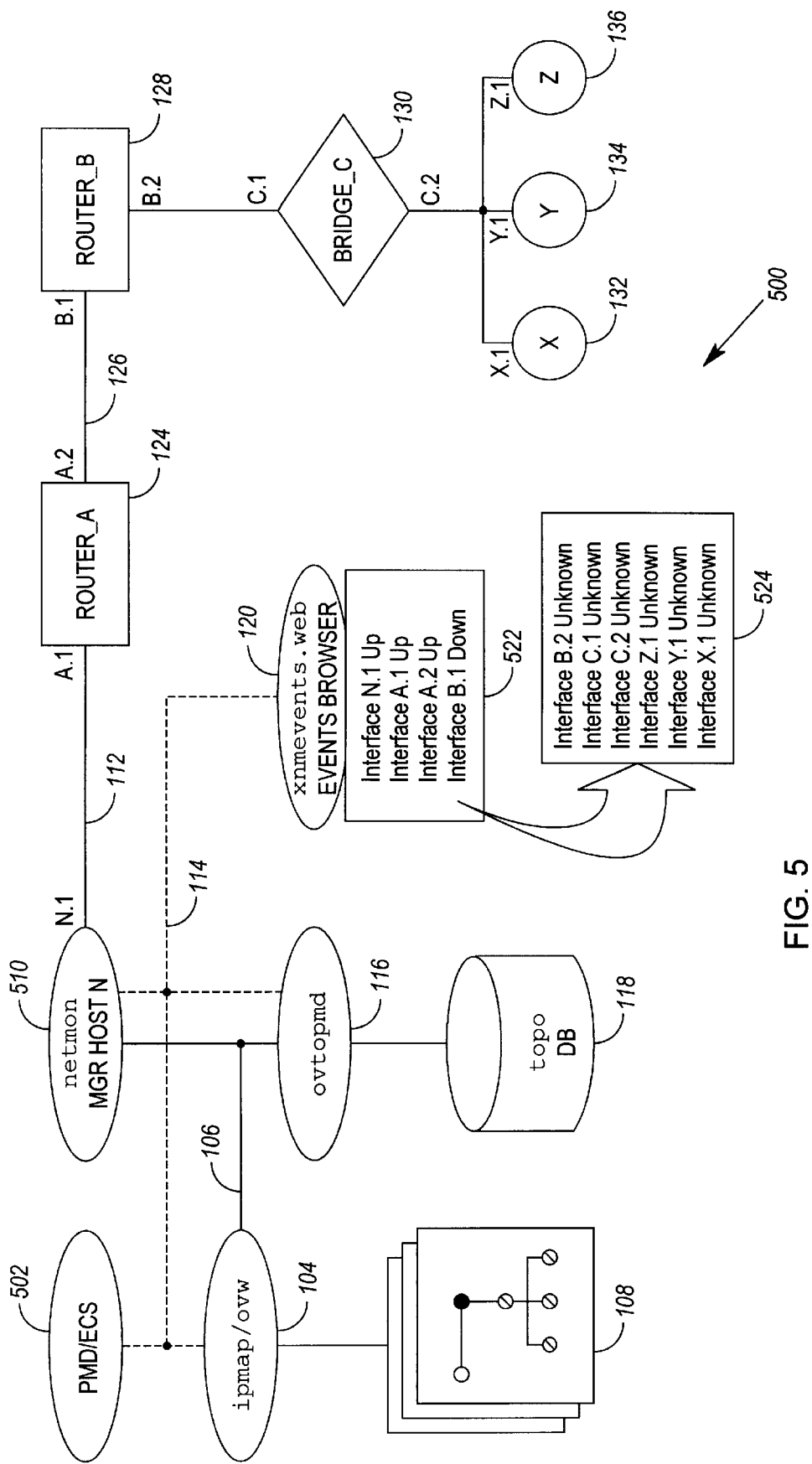
FIG. 5 is a block diagram of a preferred network administrator display in a [< >,Down,Unknown,True] configuration.
Figure 7:
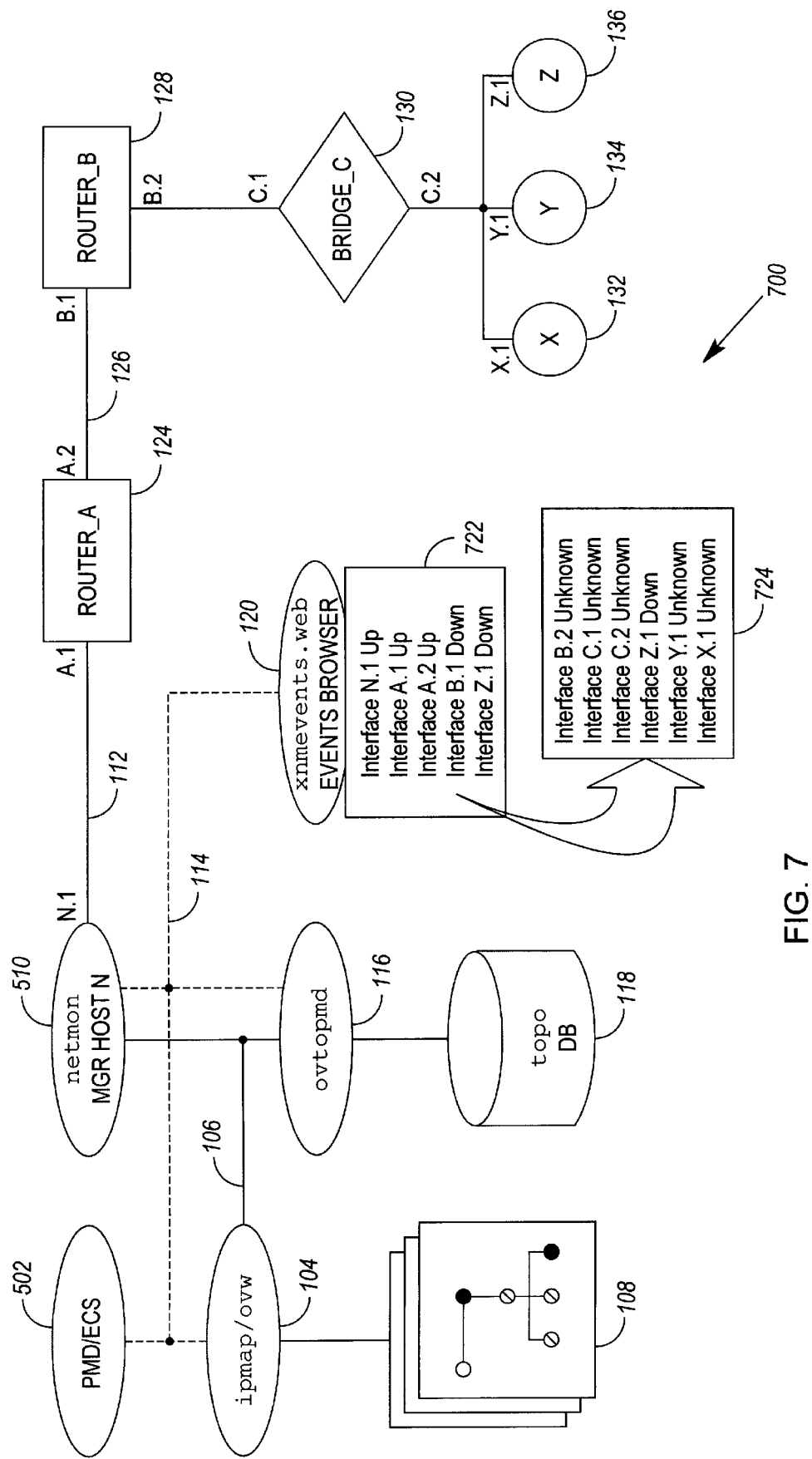
FIG. 7 is a block diagram of a preferred network administrator display in a [<serverFilter>,Down,Unknown,True] configuration.
Figure 8:
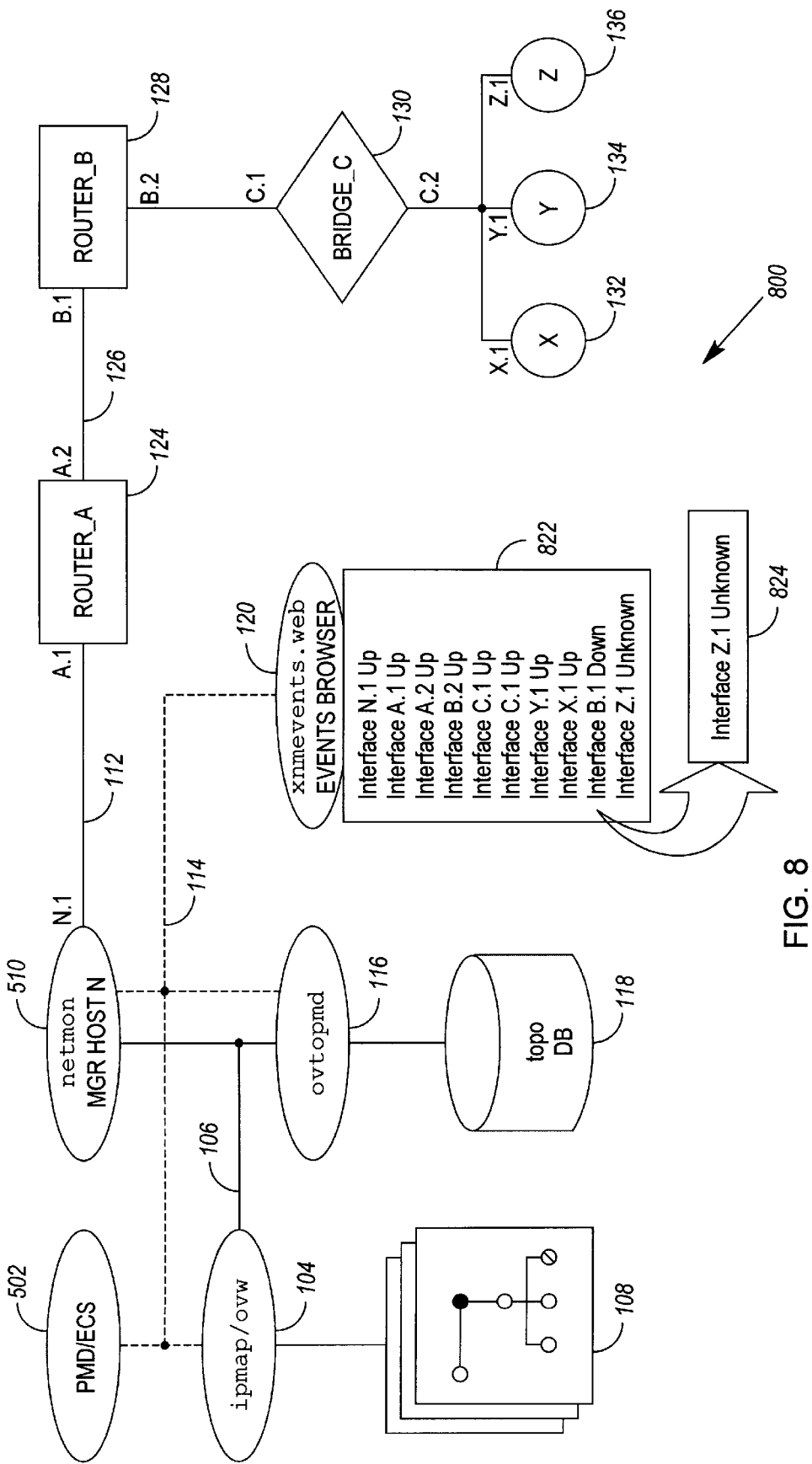
FIG. 8 is a block diagram of a preferred network administrator display in a [<serverFilter>,Unknown,lgnore,True] configuration.

Network management apparatus for distinguishing between broken and inaccessible network elements in a network, and for presenting this information to a network administrator in an easy to comprehend format, is shown in FIGS. 5, 7 & 8. The apparatus generally comprises a display process 104, 120 and a network monitor 110, connected by way of one or more event buses 114. The network monitor 110 comprises a means for discovering the topology of a plurality of network elements 124, 128–136 connected thereto, means for periodically polling a plurality of network interfaces associated with the plurality of network elements 124, 128–136, means for computing or validating a criticalRoute attribute for each of the plurality of network interfaces, and means for analyzing the status of network interfaces (e.g., N.1, A.1, A.2, B.1, B.2, C.1, C.2, X.1, Y.1, Z.1) identified by the criticalRoute attribute of an interface in question (IIQ) which is not responding to a poll.

Likewise, a computer implemented method of distinguishing between broken and inaccessible network elements, and for presenting this information to a network administrator in an easy to comprehend format, may comprise the steps of 1) discovering the topology of a plurality of network elements 124, 128–136, 2) periodically polling a plurality of network interfaces associated with the plurality of network elements 124, 128–136, 3) computing or validating a criticalRoute attribute for each of the plurality of network interfaces, and 4) analyzing the status of network interfaces identified by the criticalRoute attribute of an interface in question (IIQ) which is not responding to a poll.

Having described a method and apparatus for distinguishing between broken and inaccessible network elements in general, the method and apparatus will now be described in further detail.

The preferred embodiment of the invention is designed to work in conjunction with the OpenView Network Node Manager product for stand-alone and distributed environments (hereinafter "NNM"). The OpenView Network Node Manager is a product distributed by Hewlett-Packard Company of Palo Alto, Calif. This product is described in detail in a number of End User manuals identified by HP part numbers J1136–90000, J1136–90001, J1136–90002, J1136–90004, and J1136–90005, and a number of Developer Manuals identified by HP part numbers J1150–90001, J1150–90002, J1150–90003, and J1150–90005. These manuals are hereby incorporated by reference for all that they disclose.

The first part of this description will discuss how the system operates in a non-distributed environment. A non-distributed environment is an environment composed of one Management Station 110 and no Collection Stations, with one NNM netmon process running on the Management Station 110. The ovw and ovevents.web NA display runs on the Management Station 110.

The criticalRoute Attribute

Netmon discovers the topology of a network 100 exactly as in $NNM_{5.01}$. However, during netmon's configuration poll (which typically happens once per day) and during the first status poll of each node (after netmon begins running), netmon will compute or validate a per network interface attribute called criticalRoute.

The criticalRoute attribute is a sequence of ovtopmd DB object identifiers which correspond to the route that a network packet could take if sent from netmon to a particular interface. The criticalRoute attribute traces the path of the intervening network interfaces.

Figure 1:
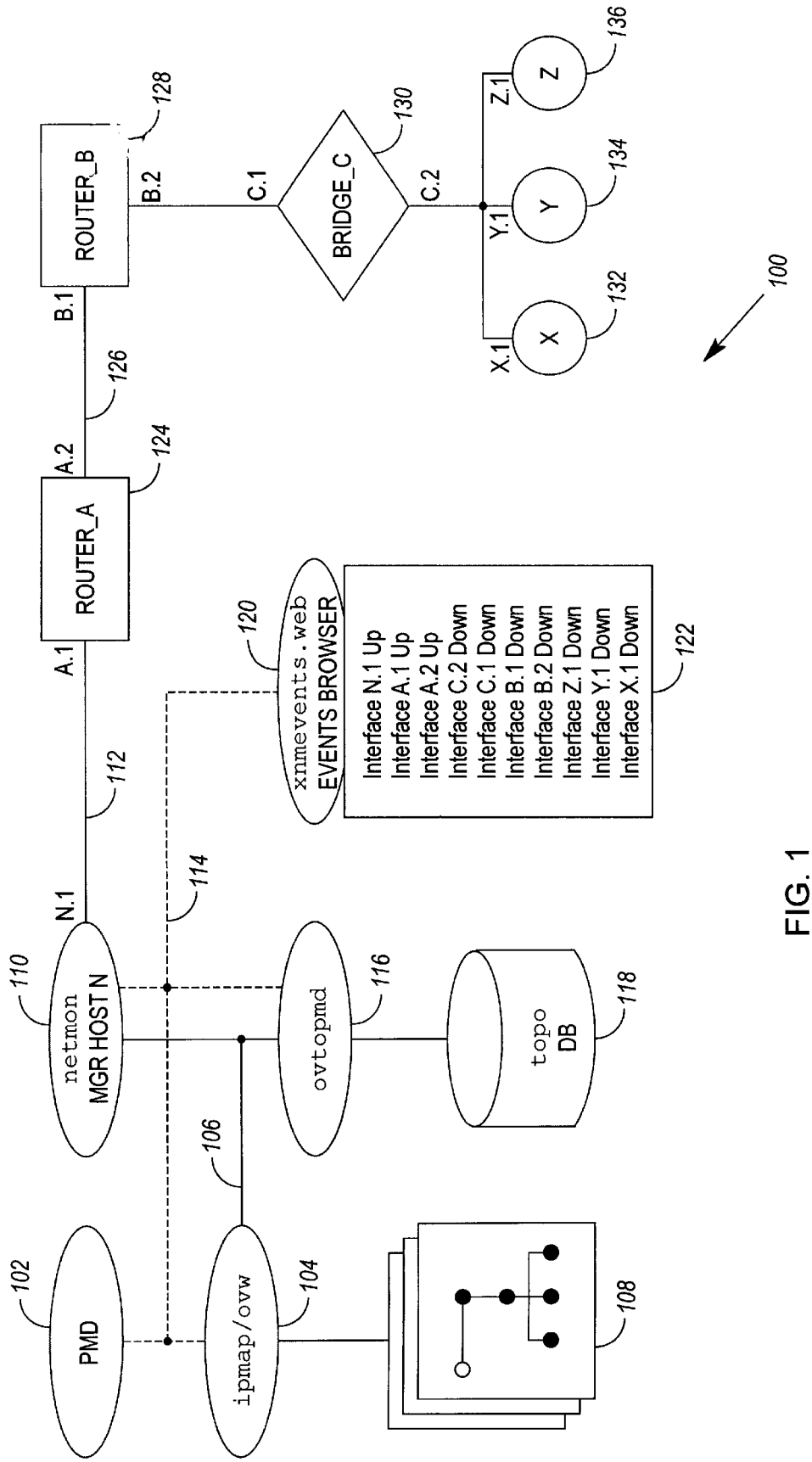
FIG. 1 is a block diagram of an $NNM_{5.01}$ network administrator display.

The following list enumerates the criticalRoute values for each network interface in FIG. 1.

| Network Interface | Critical Route |
| --- | --- |
| N.1 | N.1 |
| A.1 | N.1, A.1 |
| A.2 | N.1, A.1, A.2 |
| B.1 | N.1, A.1, A.2, B.1 |
| B.2 | N.1, A.1, A.2, B.1, B.2 |
| C.1 | N.1, A.1, A.2, B.1, B.2, C.1 |
| C.2 | N.1, A.1, A.2, B.1, B.2, C.1, C.2 |
| X.1 | N.1, A.1, A.2, B.1, B.2, C.1, C.2, X.1 |
| Y.1 | N.1, A.1, A.2, B.1, B.2, C.1, C.2, Y.1 |
| Z.1 | N.1, A.1, A.2, B.1, B.2, C.1, C.2, Z.1 |

CriticalRoute can be computed even if the network contains loops because at the moment the computation is performed, there is only one route that a packet would take. When calculating criticalRoute when multiple possibilities exist, precedence is given to routes within the same network or subnet over routes which trace outside of the network. Precedence is also given to routes containing router nodes over other non-router "multi-homed" nodes.

primaryFailures vs. secondaryFailures

Having calculated a criticalRoute attribute for each network interface, it is then possible to distinguish primaryFailure interfaces from secondaryFailure interfaces. As used herein, a primaryFailure interface is one that has failed, while a secondaryFailure interface is one that is inaccessible due to a failed interface.

Assume that netmon polls network interfaces in the same order as the events are displayed in the Event Browser 120 in FIG. 1. That is:

Interface C.2
Interface C.1
Interface B.1
Interface B.2
Interface Z.1
Interface Y.1
Interface X.1

Prior to the status poll of node BRIDGE_C's interfaces, all nodes 124, 128–136 and interfaces are Up and displayed in the color green on the ovw map 104/108. No interface Down events are in the Events Browser 120. When netmon's ping of interface C.2 times-out, netmon knows that interface C.2 is inaccessible. It does not yet know if interface C.2 is inaccessible because it is physically down with a hardware/software failure or because a connecting interface is down.

In $NNM_{5.01}$ netmon would simply set the status of the interface to Critical using the ovtopmd API 116. Ovtopmd 116 would then change the status of the interface in the topology database 118 and send out the interfaceDown event.

As part of the current method, netmon analyzes the status of interfaces along the criticalRoute for the interface in question (IIQ) and tries to determine which interface contains the hardware/software failure. As previously mentioned, the interface that is inaccessible due to its own HW/SW failure is considered a primaryFailure interface. The interfaces that are inaccessible due to the primaryFailure are considered secondaryFailure interfaces. In this scenario we have the following classification of interfaces (assuming interface B.1 has failed):

| Interface | Failure Classification |
|---|---|
| N.1 | Not failing. |
| A.1 | Not failing. |
| A.2 | Not failing. |
| B.1 | Primary Failure. |
| B.2 | Secondary Failure. |
| C.1 | Secondary Failure. |
| C.2 | Secondary Failure. |
| X.1 | Secondary Failure. |
| Y.1 | Secondary Failure. |
| Z.1 | Secondary Failure. |

Pre-crticalRouteWaitList Classification Algorithm

When netmon's ping of interface C.2 times-out, netmon examines the in-memory status of every interface along the criticalRoute path for the IIQ (interface C.2). If any interface along this path is Down (Critical), then the IIQ is a secondaryFailure interface. If the IIQ is a seconderyFailure interface, then netmon changes its status to Unknown using the libtopm changeSecondaryFailureStatus( ) API call.

Ovtopmd 116 changes the status of the interface in the topology database 118 and emits a special secondaryFailureInterfaceDown message as described in section 3.1.6. Then netmon puts the internal representation of the interface on a slowPingList and continues its normal status poll processing of other interfaces on the network.

criticalRouteWaitList Classification Algorithm

If the pre-criticalRouteWaitList interface failure classification algorithm is unable to find an interface (other than the IIQ) already down along the criticalRoute, then the status of all interfaces along the criticalRoute(IIQ) must be verified to ensure that one of these interfaces has not failed since it was checked last.

To facilitate this, netmon saves the fact that interface C.2 is inaccessible by moving the representation of this IIQ from the normal pingList to a new queue called the criticalRouteWaitList. This list has the following characteristics:

Any number of interfaces may be placed on the list.

Only the first interface on the list is processed by the criticalRouteWaitList algorithm. All other interfaces are just held.

When an interface is on this list, it is not on any other list. This prevents processing of this interface by other netmon activities.

This list has data structures to allow sequential walking of the criticalRouteWaitList(IIQ). This is important because of the threaded nature of netmon. After sending a ping to a particular interface on the criticalRoute(IIQ), netmon performs other tasks while waiting for the ping response to return or for a time-out to occur.

Netmon interrogates each interface along the criticalRoute on behalf of the interface in question (IIQ) by sending a ping, one interface at a time beginning with the netmon node's interface (at the Management Station 110), until it finds an interface down or it arrives back at the IIQ's inaccessible interface.

If an interface (other than the IIQ) is Down, then it is processed as a primaryFailure interface. The interface's status is changed to Critical using the $NNM_{5.01}$ libtopm API. Ovtopmd changes the status of the interface in the topology database 118 and emits a special primaryFailureInterfaceDown message. Then netmon moves the internal representation of the interface from the criticalRouteWaitList to the slowPingList and continues its normal status poll processing of other interfaces on the network 100.

If a primaryFailure (other than the IIQ) is found, then the failure of the IIQ is a secondaryFailure, and is processed as described above for secondaryFailures. Netmon changes the status of the IIQ to Unknown using the libtopm secondaryFailure( ) API call. Ovtopmd 116 changes the status of the interface in the topology database 118 and emits a special secondaryFailureInterfaceDown message as described below. Then netmon puts the internal representation of the interface on the slowPingList and continues its normal status poll processing of other interfaces on the network 100.

If no primaryFailure interface along the criticalRoute (IIQ) can be found, then the criticalRouteWaitList processing eventually arrives back at the IIQ interface. When this occurs we know that the IIQ is a primaryFailure. Regular primaryFailure processing occurs for the IIQ.

The interface's status is changed to Critical using the $NNM_{5.01}$ libtopmAPI. Ovtopmd 116 changes the status of the interface in the topology database 118 and emits a special primaryFailureInterfaceDown message as described below. Then netmon moves the internal representation of the interface from the criticalRouteWaitList to the slowPingList and continues its normal status poll processing of other interfaces on the network.

Poppinq the criticalRouteWaitList

While the criticalRouteWaitList is being processed, netmon continues to poll other interfaces in the network 100 as controlled by the pingList. Some of these may be inaccessible and wind up on the criticalRouteWaitList by the algorithms above. Many of these interfaces could be secondaryFailure interfaces that are due to the same primaryFailure interface. It would be very inefficient to verify the status of the entire criticalRoute for each secondaryFailure interface.

By the time the first secondaryFailure interface has been identified and processed, the primaryFailure interface has also been identified and processed. This means that it's now possible to determine if the new IIQ (IIQ2) is a primaryFailure interface or a secondaryFailure interface by examining the in-memory status of each interface along the criticalRoute(IIQ2) using the pre-criticalRouteWaitList classification algorithm, and avoid wasting time sending additional pings.

If it can be determined that IIQ2 is a secondaryFailure, then secondaryFailure processing occurs, the interface is moved from the criticalRouteWaitList and placed in the slowPingList and no verification of the criticalRoute status is required. Otherwise, processing for the IIQ2 continues in similarly to processing of the IIQ.

Interface Down events for primaryFailures and secondaryFailures

Discussions above suggest that the ovtopmd daemon 116 is responsible for changing the status of network elements 124, 128–136 in the topology database 118 and sending out related events. It does so on behalf of other processes when they instruct it to using the libtopm API.

There is no change to this API for primaryFailure events and primaryFailure events use the $NNM_{5.01}$ event format without change. However, for secondaryFaillre events, information about the secondaryFailure must be communicated, and in addition, the primaryFailure interface must be identified. This added requirement is necessary so that an event correlation system such as ECS 408 (FIG. 4; distributed by Hewlett-Packard Company of Palo Alto, Calif.) can distinguish between the two types of events and correlate and/or suppress them.

This is accomplished by adding an additional var-bind (SNMP var-binds are described in detail in "Simple Book" by Marshall Rose) to the regular pimaryFailure event format. This extra var-bind is called . . . primaryFailureUuid and contains the event UUID (Universally Unique IDentifier is a handle that is unique to each event) of the corresponding primaryFailure event. UUID is a handle that is unique to each event across any computer in a network. There is a separate API call, changeSecondaryFailureStatus( ), in libtopm which is used to change the status of the network element. The parameters of the API call are identical to the call used for primaryFailures, plus the addition of the ovwDbId of the primaryFailure network element (and the behavior is different).

When the primaryFailure API call changeStatus( ) is made, ovtopmd 116 changes the status in the topology database 118 and sends out the appropriate event as in $NNM_{5.01}$. In addition, it records in its process memory the UUID of the Down event.

When the secondaryFailure API call changeSecondaryFailureStatus( ) is made, ovovtopmd 116 changes the status in the topology database 118, and constructs an event as in $NNM_{5.01}$. In addition, it takes the ovwDbId parameter and looks up the corresponding primaryFailure event UUID and creates a primaryFailureUuid var-bind to include in the secondaryFallure event. Then it emits the event. The UUID of the secondaryFailure event is recorded in ovovtopmd's process memory for possible later use.

slowPingList

The slowPingList allows netmon to perform its polling of down interfaces without getting behind on interfaces which are up. By segregating Down interfaces (which are likely to still be down the next time they are polled) from Up interfaces, netmon will be able to alert the network administrator of transitions from Up to Down in a timely fashion. Netmon will also attempt fewer retries for interfaces on the slowpingList, thereby limiting the time and network bandwidth "wasted" performing these operations.

PMD/ECS Event Distribution

Figure 2:
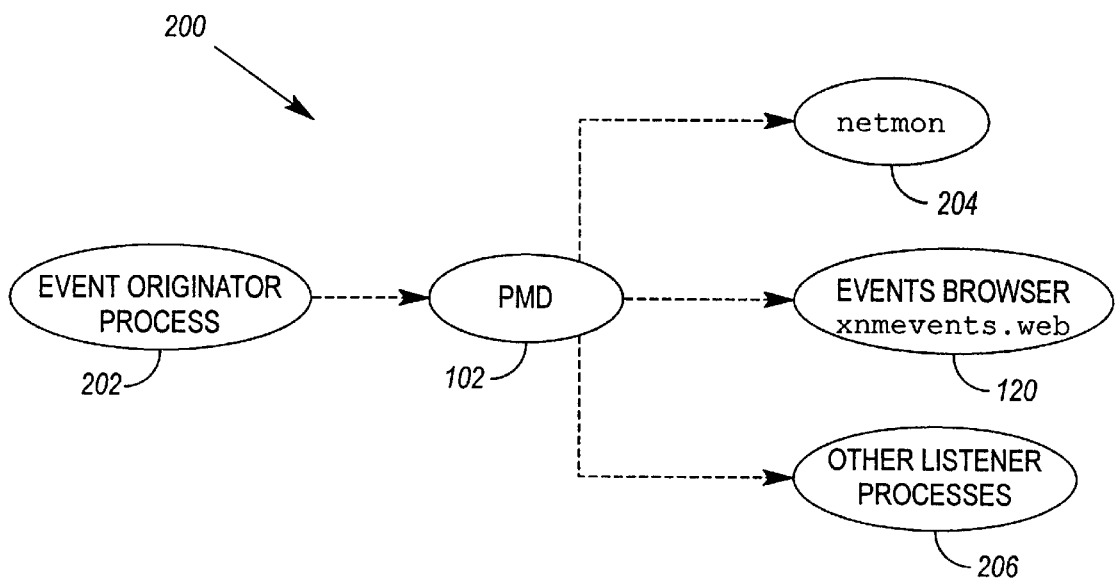
FIG. 2 is a block diagram of an $NNM_{5.01}$ event distribution system.
Figure 3:
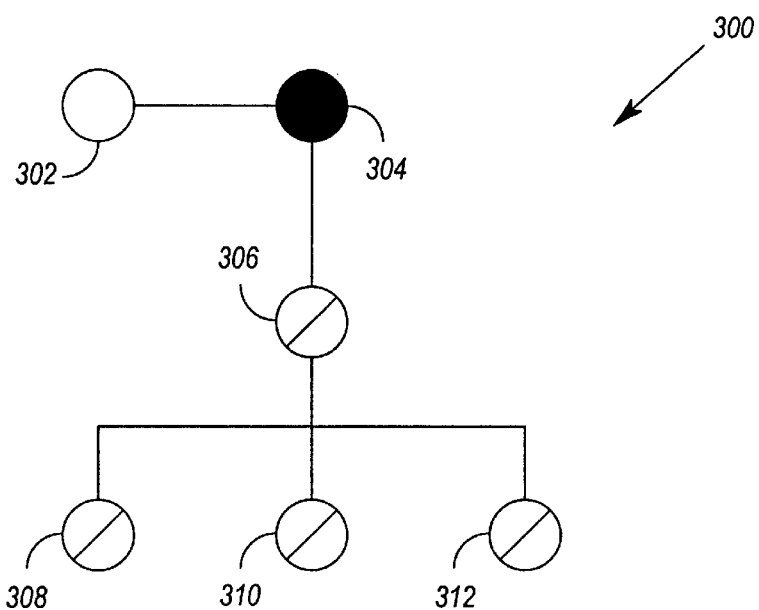
FIG. 3 is a graphical display of network element health.

FIG. 1 is a simplified illustration of the $NNM_{5.01}$ architecture, including an event system bus 114. An event system bus 114 may not actually exist. Rather, a socket connection from every communicating tool 120, 202–206 to and from the PMD (Post Master Daemon) process 102 may exist (See FIG. 2). A sender 202 sends an event to the PMD process 102 and the PMD 102 distributes the event to every listener 120, 204, 206. The connections may be bidirectional so that every process 102, 120, 202–296 can be a listener and an originator.

Figure 4:
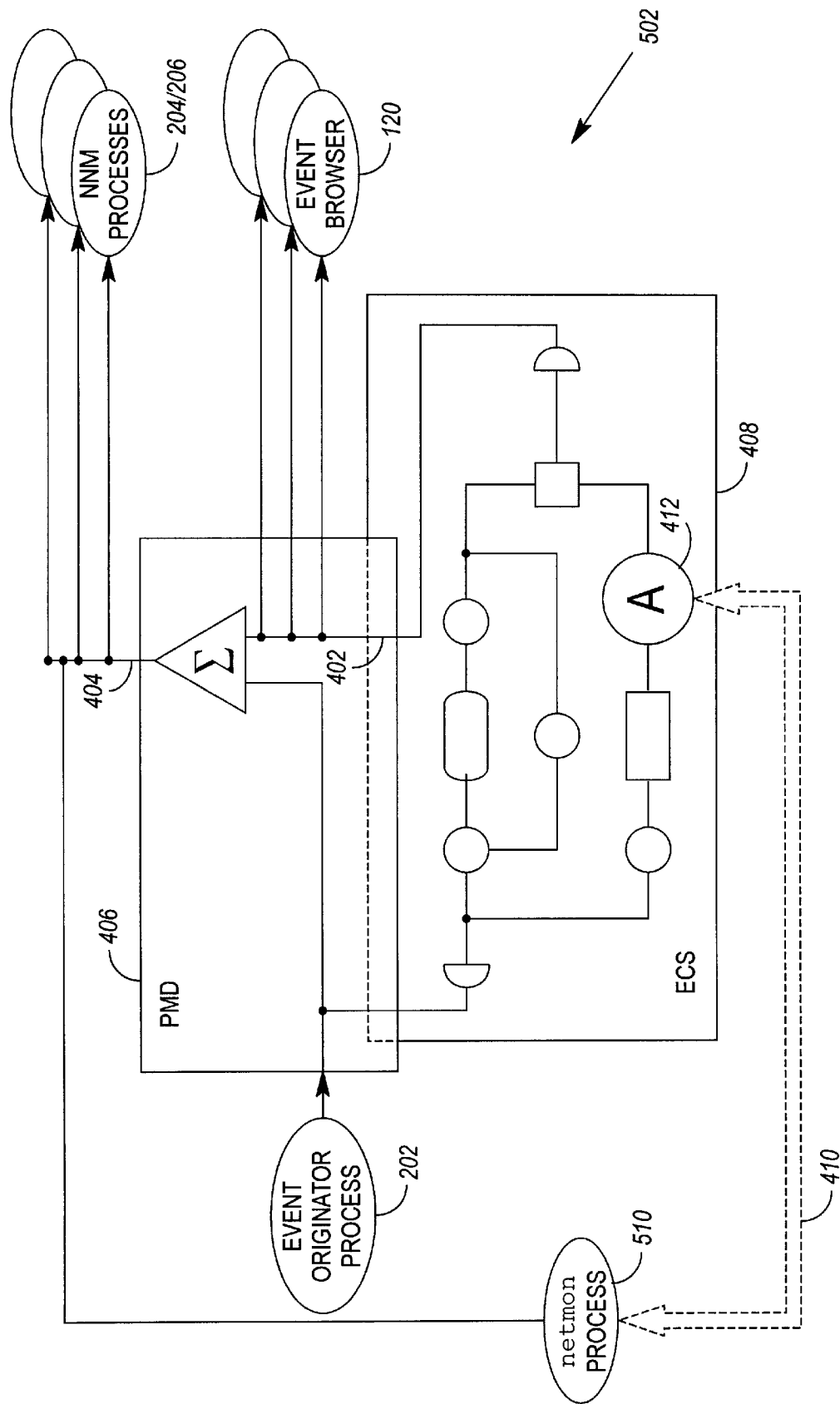
FIG. 4 is a block diagram of a preferred event distribution system.

In the preferred embodiment of the system presented herein, the Event System 200 is enhanced by incorporating an Event Correlation System (ECS) 408 into the PMD process 406 (See FIG. 4). ECS 408 is yet another product distributed by Hewlett-Packard Company. This product is described in detail in the "ECS 2.0 Designer's Reference Manual" identified by HP part number J1095–90203. This manual is hereby incorporated by reference for all that it discloses. FIG. 4 illustrates the PMD/ECS architecture 502. All events that flow into the PMD 406 flow into the ECS engine 408, which can manipulate the events in the following ways:

Events can simply pass through the ECS engine 408 unaltered.

Events can be stored in the ECS engine 408 for a period of time and released later.

Events can be suppressed by the ECS engine 408. That is, they come in but do not flow out.

Events can be correlated with other events independent of suppression. That is, an attribute is attached to the event that specifies a parent event. This facilitates the new DrillDown functionality in the Events Browser 120.

New events can be generated in addition to or in place of an event that enters ECS 408.

Events can be saved in ECS 408 for an extended period of time and used as state information to help interpret the meaning of subsequent events.

Events can trigger queries of data external to PMD 406 and the ECS engine 408, to help interpret the meaning of the current event.

The Events Browser 120, some NNM processes, and most 3rd party tools connect to the Correlated Event Bus 402. This bus 402 may have some events suppressed or delayed if the logic in the engine's circuits 408 is designed to do so. Many of the original NNM processes 204/206 connect to the Raw+Correlated Event Bus 404 so that they can see all events in the system.

It is beyond the scope of this document to describe in detail how the logic in the ECS engine 408 is organized. In brief, the logic is organized in two layers. The first layer is a graphical data flow design (ECS Circuit) constructed using a developer GUI and a suite of ECS circuit nodes of various types with various functionality. Each node of the circuit can contain a computer program written in the Event Correlation Description Language (ECDL). One of the ECS circuit elements is called an Annotate Node 412 and is used to query the corresponding Annotation Server 510 external to ECS 408 for data that is not contained in ECS 408.

User Configuration Attributes

The above-described Event System can be configured by the user to obtain one of many possible behaviors, with various trade-offs in performance and usability. The following list describes the main configurable attributes:

Critical_Node_Filter Name <String>

This netmon parameter specifies a topology filter which allows netmon to distinguish between a critical node and a regular node. Events for critical nodes may be correlated but are never suppressed by ECS 408 or netmon, even if the failure is secondary.

Critical_Node_Sec_Status <Down=Unknown>

This netmon parameter describes the new status to use for the changestatus event for a critical node with a secondaryFailure. PrimaryFailures always receive status Down, regardless of whether the node is critical or regular.

Normal_Node_Sec_Status <Down=Unknown=Ignore>

This netmon parameter describes the new status to use for the changestatus event for a regular node secondaryFailure. If the value is ignore, then the status of the node is not changed. It will remain on the map as Up even though it is inaccessible.

Sec_Fail_Event_Suppress_Switch <False=True>

This netmon boolean parameter is communicated to ECS 408 via a Router Down annotation server interface 410, and informs ECS 408 whether to suppress secondaryFailures for normal nodes (i.e. non-critical nodes).

Discussions in this document that reference these user parameters will refer to them in the order above. For example, [< >, Down, Ignore, True] indicates no filter, Critical_Node_Sec_Status=Down, Normal_Node_Sec_Status=Ignore and Sec_Fail_Event_Suppress_Switch=True.

Behavior with [< >,Down, Unknown, True] Configuration

FIG. 1 illustrates the system behavior for $NNM_{5.01}$. FIG. 5 illustrates the system behavior for the system disclosed herein, wherein the [< >, Down, Unknown, True] configuration is selected. In this system, netmon has recognized that interface B.1 is the primaryFailure, and interfaces B.2, C.1, C.2, X.1, Y.1 and Z.1 are secondaryFailures. Since B.1 is a primaryFailure interface, it is given status Critical, and displayed as red in ovw 104. An Interface B Down event is also emitted.

Since no filter has been specified (Critical_Node_Filter_Name=" "), all nodes are considered normal (i.e. no nodes are considered Critical), and the Critical_Node_Sec_Status attribute is not used. Since Normal_Node_Sec_Status=Unknown, all secondaryFailure interfaces on all nodes 124, 128–136 are displayed as blue to represent a status of Unknown (i.e., as a slashed circle in display 108 of FIG. 5).

The changestatus Unknown event is emitted by netmon/ovtopmd 110/116 for all secondaryFailure interfaces once netmon recognizes them as secondaryFailure interfaces. However, ECS 408 suppresses the events because Sec_Fail_Event_Suppress_Switch=True. Therefore, the secondaryFailure events do not show up in the xnmevents. web 120 Event Browser at the top level display 522.

New functionality in the Event Browser allows the user to invoke a menu option that brings up seeondaryFailures associated (correlated) with the selected top level event. In this case, selecting Interface B.1 Down and invoking "Show Correlated Events" brings up another dialog showing the related secondaryFailure events.

If one compares FIG. 1 to FIG. 5, one will appreciate that problems outlined in the Background section of this disclosure are solved by the FIG. 5 architecture and configuration. The ovw display 104 identifies the working nodes and interfaces (in green), the primaryFailures (in red), and all secondaryFailures (in blue). The event browser display 522 is uncluttered with secondaryFailures 524, and easily identifies the interface requiring maintenance to the NA.

Critical_Node_Filter_Name and the ECS Annotation Server

The Critical_Node_Filter_Name attribute can be specified by the user and will define two classes (critical and regular of network nodes using the $NNM_{5.01}$ networking filter language. This language allows users to describe a subset of elements in the topology database 118 based upon attributes in the database. For example, one could easily specify a group consisting of all routers 124, 128 and nodes with ipAddress 15.1.2.*.

This mechanism is provided to allow the user to identify network elements whose accessibility is essential to the productivity of the organization. For example, routers 124, 128 and servers might be critical but workstations 132–136 and PCs might not. Interfaces that are inaccessible and are primaryFailures are always given a status of Down regardless of which class they belong to. However, if an interface is inaccessible and is a secondaryFailure, then a critical node filter can be used to influence the behavior of the system.

If an interface is inaccessible and is located on a critical node (as defined by the filter and evaluated by netmon), then the Critical_Node_Sec_Status attribute value defines the status that will actually be given to the interface. The possible values are Down and Unknown. This attribute is evaluated by netmon, which is the entity that instructs ovtopmd 116 to change the status of the interface.

If an interface is inaccessible and is located on a regular node (as defined by the filter and evaluated by netmon), then the Normal_Node_Sec_Status attribute value defines the status that will actually be given to the interface. The possible values are Down, Unknown and Ignore. Again, this attribute is evaluated by netmon, which is the entity that instructs ovtopmd 116 to change the status of the interface.

A value of Down or Unknown results in behavior for regular nodes that is analogous to the behavior of cntical nodes. However, a value of ignore instructs netmon to ignore this inaccessible interface on a regular node. That is, do not change the status of the interface and do not send out any events regarding this interface. It will remain on the map as Up even though it is inaccessible.

This configuration is useful when it is desirable to minimize network traffic and NNM performance regarding nodes that are not essential to the productivity of the organization. In this situation, netmon will still put the interface on the slowPingList so that network traffic is minimized further and netmon status polling remains on schedule.

This filter is used by netmon (as described above) when it discovers that a secondaryFailure interface is Down. It is also needed by the ECS engine 408 to determine if the corresponding event should be suppressed. Since netmon is already setup to distinguish between critical and regular nodes, it makes sense to let netmon communicate this distinction to the Router Down circuit in the ECS engine 408.

It does this via the Annotation Server mechanism 412 provided by ECS 408. Whenever a circuit in ECS 408 needs to know if an event it received corresponds to a critical node or a regular node, the event flows into a corresponding Annotate Circuit Node 412, which sends the query to the Annotation Server process 510 using UNIX® Domain sockets. A mechanism other than UNIX® Domain sockets is used on Windows® NT.

The query arrives at the Router Down Annotation Server 510, which runs the ovwDbId argument through its filter evaluator and sends the boolean result back to the Annotate Circuit Node 412 in the ECS circuit 408. This particular Annotation Server is built into netmon (See FIG. 4).

Note that in a distributed system with multiple netmons running, the Critical_Node_Filter_Name attribute on the Management Station 510 may be different than the value on a Collection Station.

ECS Router Down Circuit

Figure 6:
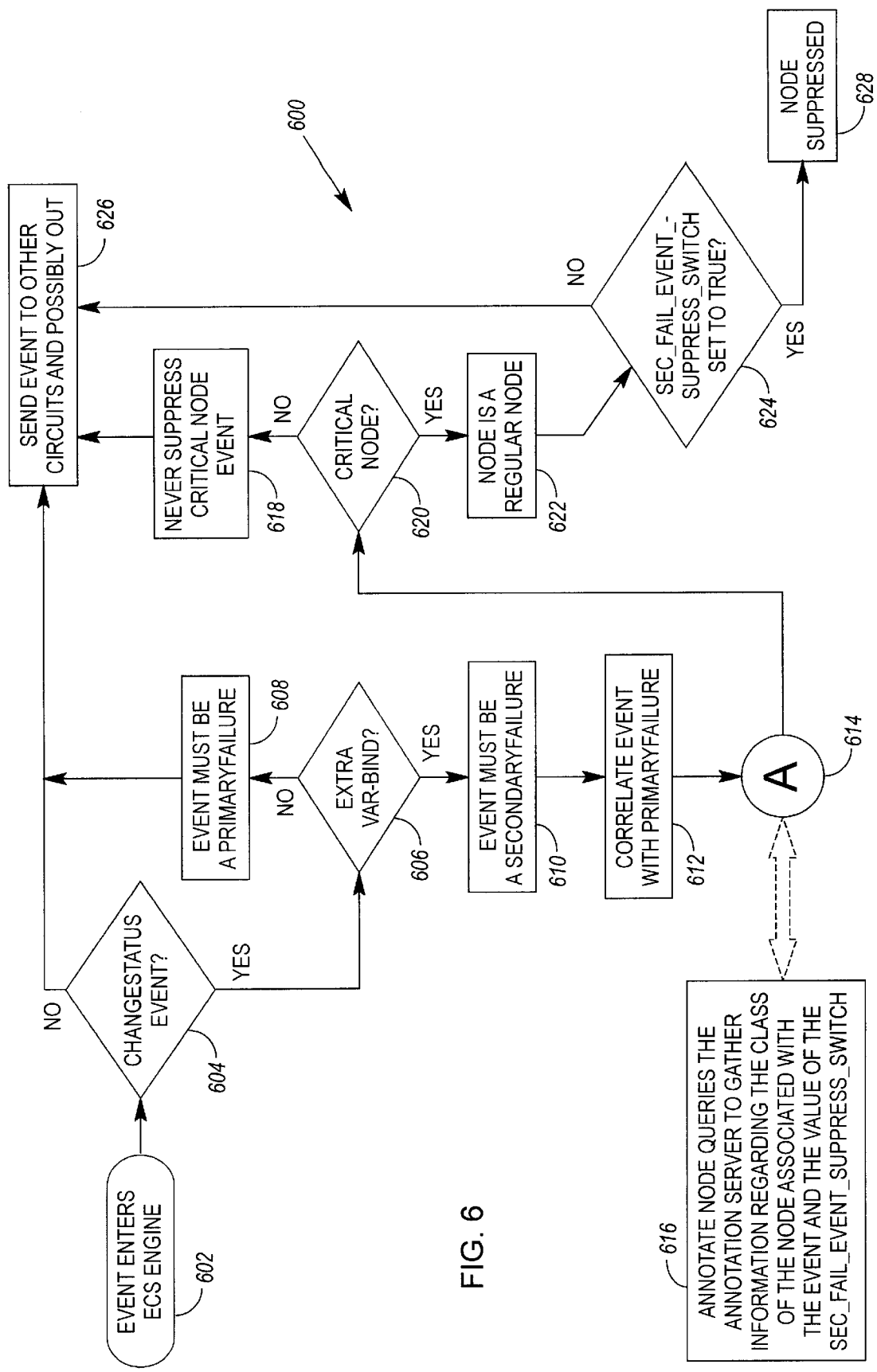
FIG. 6 is a flow chart illustrating the operation of an ECS router down circuit.

Although the ECS engine 408 has considerable power, very little of its potential is used by the Router Down circuit because most of the logic has been placed in the netmon process for performance reasons. FIG. 6 illustrates the circuit logic 600.

If the event is not a changeStatus event (nodeDown or interfaceDown) 602/604, or if the event is a primaryFailure (because no extra var-binds are present) 606, then the event is immediately passed on to other ECS circuit elements 608/626. Otherwise, the event flows into the secondaryFailure path 610 where it is correlated with the primaryFailure event 612. This correlation is nothing more than logging an attribute in a log file that identifies the parent event of the current event. This is possible because the event UUID of the parent event (the primaryFailure event) is in the extra var-bind. This correlation facilitates Drill Down with the Events Browser.

At this point the circuit needs to decide if the event should be suppressed. If the event corresponds to a critical node 620, the event will not be suppressed because it is important that the NA know that this important server or router be repaired immediately 618. The circuit determines whether the node is critical or regular by querying the Router Down Annotation server embedded in netmon 616.

If the event corresponds to a regular node 622, then the circuit examines the value of the Sec_Fail_Event_Suppress Switch attribute and behaves accordingly 624/626/628. All of these attributes are configured in netmon's configuration. This attribute is not actually used by netmon. It is only used by the ECS circuit 600. Therefore, the value of this attribute is also communicated to ECS via the Annotation Server interface.

Behavior with [<serverFilter>, Down, Unknown, True] Configuration

FIG. 7 illustrates system behavior with the [<serverFilter>, Down, Unknown, True] configuration. This configuration differs from the FIG. 5 configuration because the user has specified a filter using the Critical_Node_Filter_Name attribute. The filter in FIG. 7 has been designed to identify node Z as a critical node. For example, the productivity of the organization may be dependent on the availability of an application server running on node Z.

In this scenario, netmon has recognized that interface B.1 is the primaryFailure, and interfaces B.2, C.1, C.2, X.1, Y.1 and Z.1 are secondary. Since B.1 is a primaryFailure interface, it is given status Critical, displayed as red in ovw, and an Interface B Down event is emitted.

Since interface Z.1 is a secondaryFailure interface located on a criticalNode, it is given a status specified by the Critical_Node_Sec_Status attribute which has been configured to have a value of Down. Node Z and interface Z.1 are displayed as red in ovw, and an Interface Z.1 Down event is emitted.

All remaining secondaryFailure interfaces are given the status specified by the Normal_Node_Sec_Status attribute, which has a value of Unknown. These interfaces are displayed in blue to represent a status of Unknown.

The changestatus Unknown event is emitted by netmon/ ovtopmd for all non-critical/secondaryFailure interfaces once netmon recognizes them as secondaryFailure interfaces. However, ECS 408 suppresses the events because Sec_Fail_Event_Suppress_Switch=True. Therefore, the secondaryFailure events that do not correspond to critical nodes do not show up in the xnmevents.web Event Browser 120 at the top level display 722.

New functionality in the Event Browser 120 allows the user to invoke a menu option that brings up secondaryFailures 724 associated (correlated) with the selected top level event. In this case, selecting "Interface B.1 Down" and invoking "Show Correlated Events" brings up another dialog 724 showing the related secondaryFailure events. Notice that interface Z.1 shows up in the top level display 722 and in the Drill Down display 724. It shows up in the top level display 722 because it resides on a node that is critical. It shows up in the Drill Down display 724 because it is inaccessible due to the failure of interface B.1.

In comparing FIG. 1 to FIG. 7, one can appreciate that all three requirements identified in the Background section of this disclosure are now met by the architecture and configuration of this invention. The ovw display 104/108 identifies the working nodes and interfaces (in green), the primaryFailure interfaces (in red), the critical secondaryFailure interfaces (in red) and all regular secondaryFailures (in blue). The event browser display 722 is uncluttered with non-critical secondaryFailures, and easily identifies an interface requiring maintenance to the NA.

Behavior with [<serverFilter>, Unknown, Ignore, True]Configuration

FIG. 8 illustrates system behavior with a [<serverFilter>, Unknown, Ignore, True] configuration. This configuration differs from the configuration shown in FIG. 7 in that a user has specified that secondaryFailures of critical nodes should be given a status of Unknown, and secondaryFailures on regular nodes should be ignored.

This configuration has advantages and disadvantages. The main advantage is that system and network performance is very good because fewer status changes and events are generated on Collection and/or Management Stations. The ovw display 104/108 and the event browser display 822 communicate more of the impact of the failure because primaryFailures and secondatyFailures of interfaces of critical nodes are in different colors, and the clutter of unimportant secondaryFailures is not shown.

The disadvantage is that secondaryFaillres of unimportant nodes are displayed as accessible when they are not. This is a trade-off that that the network administrator must evaluate when he or she chooses this configuration.

In this scenario, netmon recognizes that interface B.1 is a primaryFailure, and interfaces B.2, C.1, C.2, X.1 Y.1 and Z.1 are secondary. Since B.1 is a primaryFailure interface, it is given status Critical, and is displayed as red in ovw 104/108. Furthermore, an Interface B down event is emitted.

Since interface Z.1 is a secondaryFailure residing on a critical node, it is given a status specified by the Critical_Node_Sec_Status attribute, which has been configured to have a value of Unknown. Interface Z.1 is displayed as blue in ovw, and an Interface Z1 Unknown event is emitted.

All remaining secondaryFailure interfaces are ignored. No status changes occur and no events are emitted. They continue to be displayed as green representing a status value of Up. However, netmon still goes into it's backup polling mode.

Notice that FIG. 8 shows several interface Up events, which collectively make the event display cluttered. This illustration is somewhat misleading. These interface Up events are shown to illustrate that initially when netmon discovers the nodes and interfaces, the interface Up events will be transmitted. However, that should only happen once. It will never happen again unless the node is physically moved on the network.

During typical operation, the NA will only see the two events, Interface B.1 Down and Interface Z.1 Unknown. Similarly, the interface Up events in FIGS. 1, 5 & 7 will only happen when the nodes 124, 128–136 are discovered. The displays in each of these four scenarios will be uncluttered and useful to the NA as they try to pinpoint a faulty network element.

New functionality in the Event Browser 120 allows the user to invoke a menu option that brings up secondaryFailures associated (correlated) with the selected top level event. In this case, selecting "Interface B.1 Down" and invoking "Show Correlated Events" brings up another dialog showing the related secondaryFailure events. Notice that interface Z.1 again shows up in the top level display 822, and in the Drill Down display 824. It shows up in the top level display 822 because it resides on a node that is considered critical. It shows up in the Drill Down display 824 because it is inaccessible due to the failure of interface B.1.

Behavior with [< >, Down, Down, False] Configuration

This configuration forces a system to behave very similar to $NNM_{5.01}$ because all inaccessible interfaces are given a status of Down, displayed as red in ovw, and no events are suppressed (See FIG. 1). The system behavior differs in the follow ways:

SecondaryFailure interfaces are still recognized by netmon and their node Down and interface Down events will contain the extra var-bind.

Even though the secondaryFailures are not suppressed, they are still correlated with the primaryFailure, and are also visible via Drill Down.

The back-off polling algorithm still provides performance improvements (i.e., the slowPingList is used).

Distributed Architecture

The system and method described herein is readily adaptable to a distributed environment comprising both Collection and Management Stations. An exemplary distributed environment to which the disclosed system and method are readily adaptable is described in the U.S. patent application of Eric Pulsipher et al. filed Aug. 29, 1996, Ser. No. 08/705,358 U.S. Pat. No. 5,948,055, entitled "Distributed Internet Monitoring System and Method".

While illustrative and presently preferred embodiments of the invention have been described in detail herein, it is to be understood that the inventive concepts may be otherwise variously embodied and employed, and that the appended cfaims are intended to be construed to include such variations, except as limited by the prior art.

What is claimed is:

1. A network monitor for distinguishing between broken and inaccessible network elements, comprising:
   a) one or more computer readable storage mediums; and
   b) computer readable program code stored in the one or more computer readable storage mediums, the computer readable program code comprising:
      i) code for discovering the topology of a plurality of network elements;
      ii) code for periodically polling a plurality of network interfaces associated with the plurality of network elements;
      iii) code for computing or validating a criticalRoute attribute for each of the plurality of network interfaces; and
      iv) code for analyzing a status of network interfaces identified by the criticalRoute attribute of an interface in question (IIQ) which is not responding to a poll.

2. A network monitor as in claim 1, wherein the code for computing a criticalRoute attribute for a particular network interface of a network element comprises code for identifying a route taken by a packet used to poll the particular interface.

3. A network monitor as in claim 1, further comprising code for establishing a slowPingList and placing in-memory representations of broken or failed network interfaces thereon.

4. Network management apparatus for distinguishing between broken and inaccessible network elements, and for presenting this information to a network administrator in an easy to comprehend format, comprising:
   a) a display process; and
   b) a network monitor comprising:
      i) means for discovering the topology of a plurality of network elements connected thereto;
      ii) means for periodically polling a plurality of network interfaces associated with the plurality of network elements;
      iii) means for computing or validating a criticalRoute attribute for each of the plurality of network interfaces; and
      iv) means for analyzing a status of network interfaces identified by the criticalRoute attribute of an interface in question (IIQ) which is not responding to a poll;
   wherein the display process and network monitor communicate by way of one or more event buses.

5. Network management apparatus as in claim 4, further comprising:
   an event correlation system;
   wherein the one or more event buses comprise a correlated event bus; and
   wherein the display process receives event data over the correlated event bus.

6. Network management apparatus as in claim 5, wherein:
   a) the system further comprises an annotation server;

b) the event correlation system comprises an annotation node; and c) the annotation server and the annotation node communicate by way of a communication channel.

7. Network management apparatus as in claim 6, wherein the annotation server is configured to process the following annotation information:

a) an annotation providing for critical node recognition;

b) an annotation indicating how critical node secondary-Failures should be processed and displayed;

c) an annotation indicating how regular node secondary-Failures should be processed and displayed; and d) an annotation providing for regular node secondary-Failure suppression.

8. Network management apparatus as in claim 6, wherein the annotation server comprises a portion of the network monitor.

9. Network management apparatus as in claim 5, wherein:

a) the event correlation system comprises a means for suppressing events so they do not appear on the correlated events bus; and b) the display process comprises a drill down interface through which various suppressed events may be called up for viewing.

10. A computer implemented method of distinguishing between broken and inaccessible network elements, and for presenting this information to a network administrator in an easy to comprehend format, comprising the steps of:

a) discovering the topology of a plurality of network elements;

b) periodically polling a plurality of network interfaces associated with the plurality of network elements;

c) computing or validating a criticalRoute attribute for each of the plurality of network interfaces; and d) analyzing a status of network interfaces identified by the criticalRoute attribute of an interface in question (IIQ) which is not responding to a poll.

11. A method as in claim 10, wherein the step of analyzing the status of network interfaces identified by the criticalRoute attribute of an IIQ which is not responding to a poll comprises the steps of:

a) first examining in-memory statuses of one or more network interfaces to determine whether a network interface identified by the criticalRoute attribute for the IIQ is Down, and if so, identifying that network interface as a primaryFailure interface;

b) second, if a network interface identified by the criticalRoute attribute for the IIQ has not been identified as a primaryFailure interface, verifying the statuses of one or more network interfaces identified by the criticalRoute attribute for the IIQ to determine if one of them is a primaryFailure interface; and c) third, if a network interface identified by the criticalRoute attribute for the IIQ has not been identified as a primaryFailure interface, identifying the IIQ as a primaryFailure interface.

12. A method as in claim 11, wherein the steps of examining in-memory statuses of one or more network interfaces, and verifying the statuses of one or more network interfaces, each comprise the step of examining or verifying network interfaces identified by the criticalRoute attribute for the IIQ:

a) one at a time; and b) beginning with a network interface closest to a network monitor's interface.

13. A method as in claim 10, further comprising the step of maintaining a criticalRouteWaitList, wherein a pre-criticalRouteWaitList algorithm comprises the steps of:

a) examining in-memory statuses of one or more network interfaces to determine whether a network interface identified by the criticalRoute attribute for the IIQ is Down, and if so, identifying that network interface as a primaryFailure interface; and b) if the above step successfully identifies a network interface as a primaryFailure interface, i) identifying the IIQ as a secondaryFailure interface;

ii) emitting a secondaryFailureInterfaceDown event; and iii) placing an in-memory representation of the IIQ on a slowPingList.

14. A method as in claim 13, further comprising the step of, if the step of examining in-memory statuses of one or more network interfaces successfully identifies a network interface as a primaryFailure interface, changing the status of the IIQ to Unknown in a topology database.

15. A method as in claim 13, wherein a criticalRouteWaitList algorithm comprises the steps of:

a) if none of the network interfaces identified by the criticalRoute attribute for the IIQ have been identified as a primaryFailure interface, verifying the statuses of one or more network interfaces identified by the criticalRoute attribute for the IIQ by, i) moving an in-memory representation of the IIQ, and all network interfaces identified by the criticalRoute attribute for the IIQ, to a criticalRouteWaitList, and removing these network interfaces from all other lists accessible to a network monitor executing this method;

ii) sequentially walking the criticalRouteWaitList, polling each network interface to determine if it is a primaryFailure interface; and b) if a network interface identified by the criticalRoute attribute for the IIQ has not been identified as a primaryFailure interface, identifying the IIQ as a primaryFailure interface, otherwise identifying the IIQ as a secondaryFailure interface.

16. A method as in claim 15, further comprising the steps of, after a primaryFailure interface has been identified:

a) changing the status of the primaryFailure interface to Critical in a topology database;

b) emitting a primaryFailureInterfaceDown event; and c) moving the in-memory representation of the primaryFailure interface from the criticalRouteWaitList to the slowPingList.

17. A method as in claim 15, further comprising the steps of, if the step of verifying statuses of one or more network interfaces successfully identifies a network interface as a primaryFailure interface, a) identifying the IIQ as a secondaryFailure interface;

b) emitting a secondaryFailureInterfaceDown event; and c) moving the in-memory representation of the IIQ to the slowPingList.

18. A method as in claim 10, wherein the step of computing a criticalRoute attribute for a particular interface of a network node comprises giving preference to a route comprising router nodes.

19. A method as in claim 10, further comprising the step of using an IIQ's criticalRoute attribute to identify an IIQ as a primaryFailure interface or a secondaryFailure interface.

20. A method as in claim 19, further comprising the step of assigning a UUID var-bind to primaryFailure interfaces and secondaryFailure interfaces.

21. A method as in claim 20, wherein the step of assigning a UUID var-bind to a particular secondaryFailure interface comprises the steps of:

a) looking up a corresponding primaryFailure interface UUID var-bind; and b) including the corresponding primaryFailure interface UUID var-bind in a UUID var-bind for the particular secondaryFailure interface.

* * * * *